United States Patent [19]
Weir et al.

[11] 3,935,391
[45] Jan. 27, 1976

[54] TIME DIVISION MULTIPLEX SWITCHING SYSTEM

[75] Inventors: Donald Adams Weir, Goff's Oak; William Arthur George Walsh, New Barnet, both of England

[73] Assignee: International Standard Electric Corporation, New York, N.Y.

[22] Filed: July 8, 1974

[21] Appl. No.: 486,596

[52] U.S. Cl....... 179/15 A; 179/15 AQ; 179/15 BM
[51] Int. Cl.[2] ........................................... H04J 3/00
[58] Field of Search ........ 179/15 A, 15 AT, 15 AQ, 179/15 BM, 15 BV, 15 AP, 15 BY

[56] References Cited
UNITED STATES PATENTS

| | | | |
|---|---|---|---|
| 3,727,005 | 4/1973 | Franaszek | 179/15 BM |
| 3,740,483 | 6/1973 | Pedersen | 179/15 AQ |

Primary Examiner—Ralph D. Blakeslee
Attorney, Agent, or Firm—James B. Raden; Delbert P. Warner

[57] ABSTRACT

An automatic telecommunication switching system is disclosed for switching TDM speech signals and data signals between calling and called parties. The system includes auxiliary circuits. Such circuits may include a monitor or comparator to detect the presence of a particular code. They may include a code converter for receiving a code of one variety and transmitting one of another variety or for changing the speed between reception and transmission.

6 Claims, 4 Drawing Figures

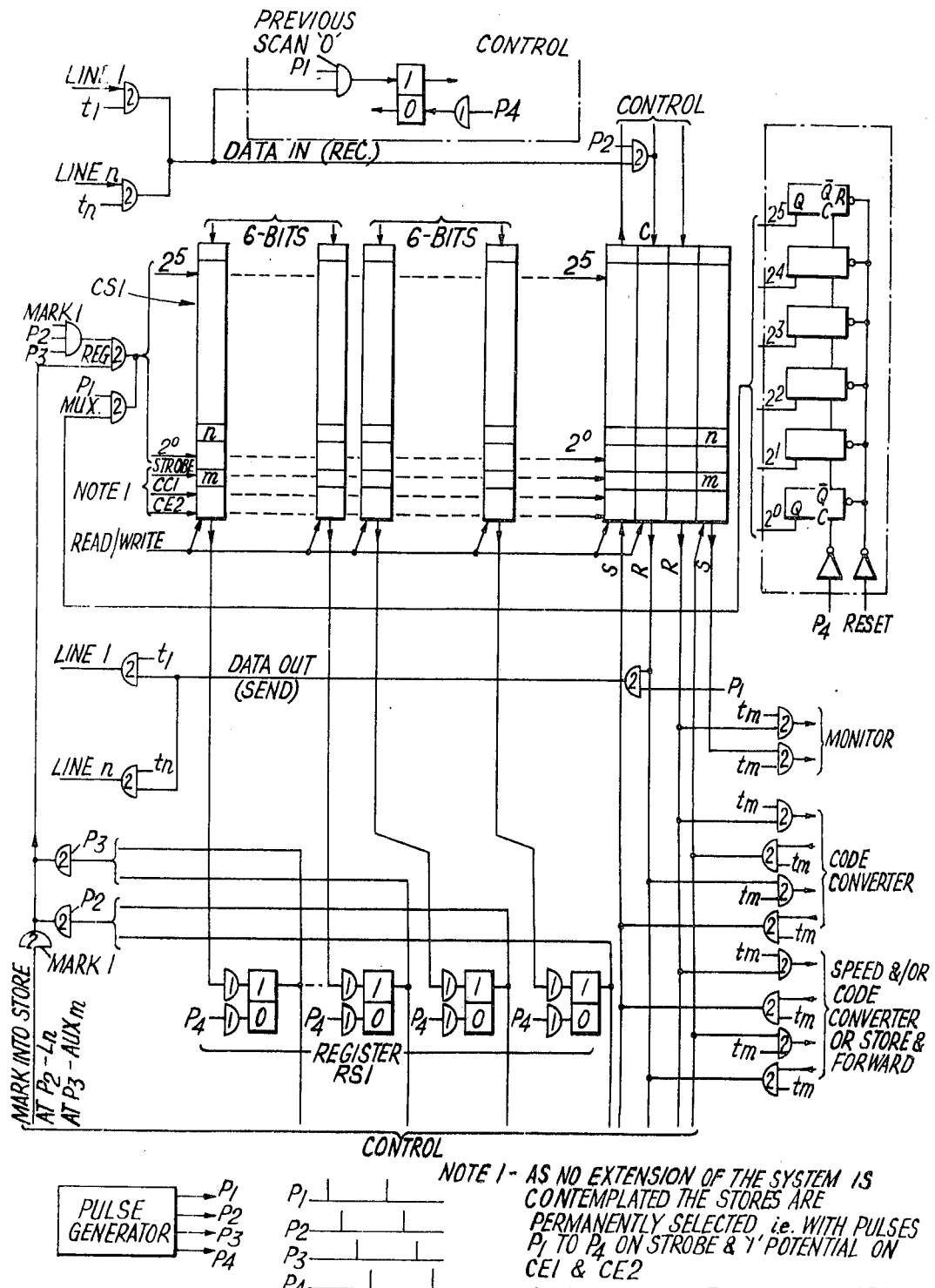
Fig.3. - SYSTEM REALISATION

Fig. 4.

| SELECTION UNDER CONTROL OF | POSITION | PULSES | FUNCTIONS | REMARKS |
|---|---|---|---|---|
| (1) MONITOR FUNCTION :— | | | | |
| MUX | $L_l$ | $P_1$ | READ $L_n + AUX_m + C \rightarrow$ TO $L_l$ INTO REGISTER | SEND INFORMATION FROM $L_n$ |
| REG | $L_n$ | $P_2$ | WRITE $C \leftarrow$ FROM $L_l$ | STORE INFORMATION FROM $L_l$ |
| REG | $AUX_m$ | $P_3$ | WRITE $C_l \leftarrow$ FROM $L_l$ | STORE $L_l$ REG IN $AUX_m$ |
| — | — | $P_4$ | CLEAR REGISTER – STEP MUX | |
| MUX | $L_n$ | $P_1$ | READ $L_l + AUX_m + C \rightarrow$ TO $L_l$ INTO REGISTER | SEND INFORMATION FROM $L_l$ |
| REG | $L_l$ | $P_2$ | WRITE $C \leftarrow$ FROM $L_n$ | STORE INFORMATION FROM $L_n$ |
| REG | $AUX_m$ | $P_3$ | WRITE $C_n \leftarrow$ FROM $L_n$ | STORE $L_n$ REG IN $AUX_m$ |
| — | — | $P_4$ | CLEAR REGISTER – STEP MUX | |
| MUX | $AUX_m$ | $P_1$ | READ $L_l + L_n + C_l + C_n$ INTO REGISTER TO MONITOR | |
| — | — | $P_4$ | CLEAR REGISTER – STEP MUX | |
| (2) CODE CONVERTER FUNCTION :— | | | | |
| MUX | $L_l$ | $P_1$ | READ $L_n + AUX_m + C \rightarrow$ TO $L_l$ INTO REGISTER | SEND INFORMATION FROM $AUX_m$ $C_l$ |
| REG | $AUX_m$ | $P_3$ | WRITE $C_l \leftarrow$ FROM $L_l$ | STORE $L_l$ REG IN $AUX_m$ |
| — | — | $P_4$ | CLEAR REGISTER – STEP MUX | |
| MUX | $L_n$ | $P_1$ | READ $L_l + AUX_m + C \rightarrow$ TO $L_n$ INTO REGISTER | SEND INFORMATION FROM $AUX_m$ $C_n$ |
| REG | $AUX_m$ | $P_3$ | WRITE $C_n \leftarrow$ FROM $L_n$ | STORE $L_n$ REC IN $AUX_m$ |
| — | — | $P_4$ | CLEAR REGISTER – STEP MUX | |
| MUX | $AUX_m$ | $P_1$ | READ $L_l + L_n + C_l + C_n$ INTO REG TO CODE CONV. | EXTEND TO CODE CONVERTER |
| REG | $L_l$ | $P_2$ | WRITE $C$ FROM CODE CONVERTER | RECEIVE FROM CODE CONVERTER |
| REG | $L_n$ | $P_3$ | WRITE $C$ " " " | |
| — | — | $P_4$ | CLEAR REGISTER – STEP MUX | |

(3) SPEED &/OR CODE CONVERTER OR STORE & FORWARD IDENTICAL WITH (2)

TIME DIVISION MULTIPLEX SWITCHING SYSTEM

BACKGROUND OF THE INVENTION

1. Field of the Invention

This invention relates to an automatic telecommunication switching center in which connections are set up in time division multiplex (TDM) manner and includes means functioning as a line scanner. The system includes auxiliary circuits to monitor code signals used, to detect codes, to convert one code to another, to adjust the speed between received and transmitted codes and/or to store and forward code signals.

2. Summary of the Invention

According to the invention there is provided an automatic telecommunication switching center, in which connections between communication channels are set up in TDM manner with each said channel allocated a time slot in the TDM cycle, in which the channels are all terminated at a storage array housing a storage compartment per channel served, in which each of said storage compartments has an "in" section and an "out" section, in which intelligence incoming to the center over one of the channels is recorded directly into that channel's "in" section, in which when a connection is set up between a first and a second channel each of these channels' "in" sections has recorded in it the storage address of the other of those channels plus the intelligence to be sent to that other channel, in which when the compartment for said first channel is scanned during said connection the intelligence in that channel's "out" section is read out to that channel and the contents of that first channel's "in" section is extracted and transferred to the second channel's "out" section under control of the address in that "in" section, in which the intelligence thus extracted from said first channel's "in" section is replaced by intelligence newly received from said first channel, in which when the compartment for said second channel is scanned during said connection the intelligence in that channel's "out" section is read out to the said second channel and the contents of that second channel's "in" section is extracted and transferred to the first channel's "out" section under control of the address in the second channel's "in" section, and in which the intelligence thus extracted from said second channel's "in" section is replaced by intelligence newly received from said second channel.

Further, the invention provides for the connection of an auxiliary circuit in parallel with the circuit between channels A and B, which auxiliary circuit may be used in various ways. For example, it may be used to connect a comparator into the system so that a particular code may be detected when it occurs in the normal transmission of information. Such a requirement is encountered in the case of data connections which are alternative to speech connections, so that a connection may be set up in the speech mode, but may be terminated in the data mode by some form of coded signal. In this case a monitor detects the presence of such an end signal and clears the connection accordingly.

Another application is to the conversion of the code which might be received in one variety and transmitted in another, while retaining the same basic character rate. In this case the information is not directly connected through from A to B and vice versa, but via the auxiliary circuit and through the auxiliary circuit into the code converter and back with the converted code to the direction concerned.

Similarly, in the case of code conversion involving a speed change or for store and forward facilities where storage is involved, the system can carry out a similar function to that outlined for code conversion, the information received on channel A being transferred via the auxiliary circuit to the appropriate converter-speed changer and retransmitted from the converter in the appropriate direction. The intelligence is handled in a delta modulation form, which is a variant of PCM in which intelligence is sent to each time slot as a bit of one polarity or a bit of the opposite polarity, depending upon whether the signal is increasing or decreasing. However, the invention can equally be used where the intelligence handled is in conventional PCM or other forms of coding.

BRIEF DESCRIPTION OF THE DRAWINGS

An embodiment of the invention will now be described with reference to the accompanying drawings in which FIG. 3 shows a system such as that of FIG. 2 in more detail, and FIG. 4 is an explanatory table which relates to system functions when using a non-destructively read but changeable store.

DESCRIPTION OF PREFERRED EMBODIMENTS

Figure 1:
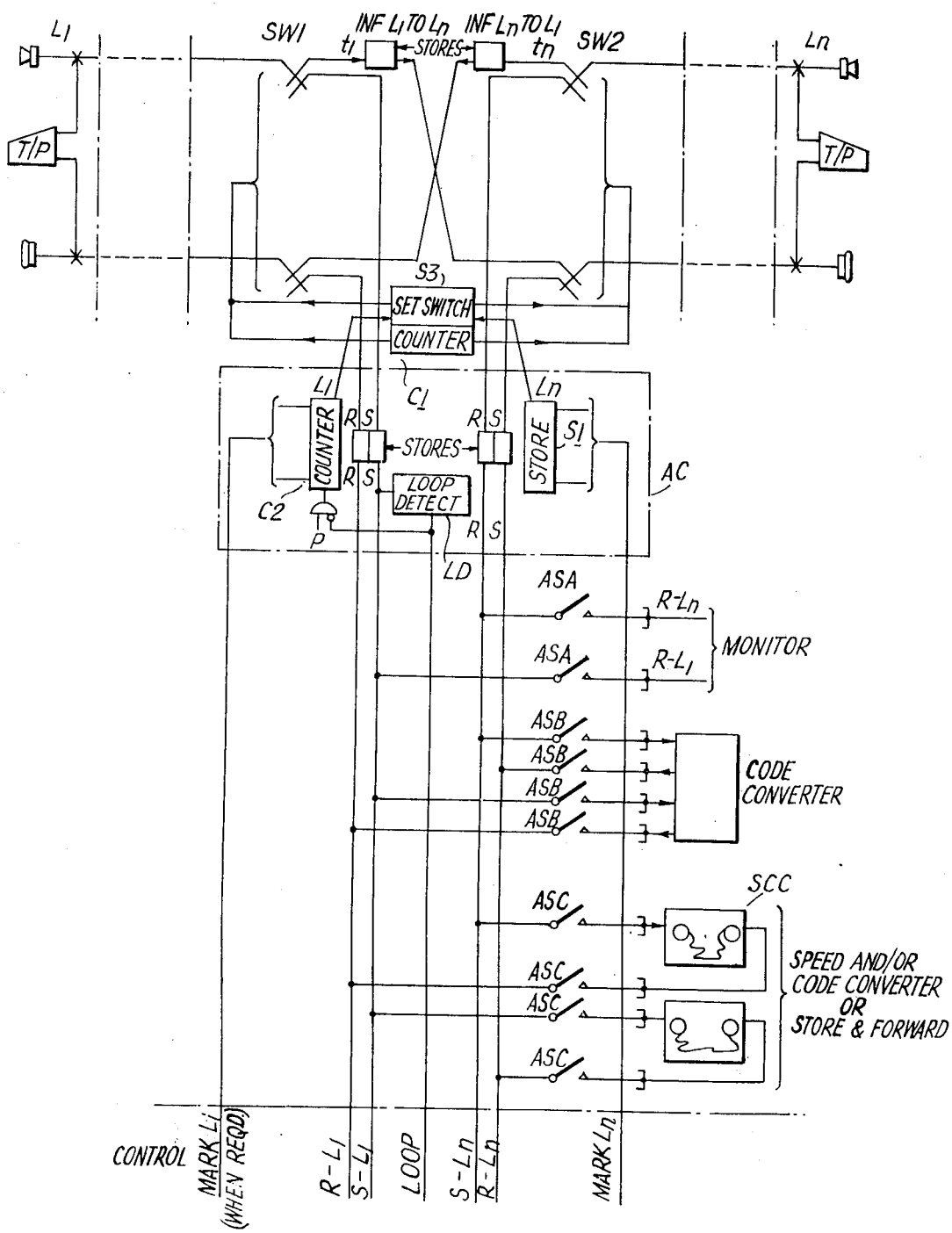
FIG. 1 is a schematic diagram of a switching center according to the invention, with special reference to the connection of an auxiliary circuit.

Referring to FIG. 1, lines Ll and Ln are of the "4-wire" type and are connected through switches SW1, SW2, which are under the control of a set switch S3 or a counter C1. These switches are shown diagrammatically as if they were electromechanical ones, but in fact in a preferred embodiment they will be electronic switches which are set on a multiplex basis, as will be described, It will be seen that information received from line Ll is transferred to the receive side of line Ln, while information sent from line Ln is transferred to the receive side of line Ll. Further, there is an auxiliary circuit AC connected to both sides of the connection, so that information stored in counter C2 can also be stored in the store S1 of the auxiliary circuit. Hence the auxiliary circuit may handle intelligence in parallel with its transfer to the associated party, and it is so arranged that it may be "looking" (i.e, acting as a line finder) by means of its counter C2 to find a line which is calling. When detected, the loop condition of the line is detected by the loop detector LD, which prevents the count from proceeding further, and enables the auxiliary circuit AC to remain connected to that particular time position, which may be $t_1$ in the present example, which found a calling loop. Thus the auxiliary circuit is assigned to the particular calling line, and if it is assumed that the call is intended for line Ln, then a "connection" is set up between time positions $t_l$ and $t_n$ with the auxiliary circuit in parallel.

It is now assumed that the party decides to send data instead of speech. In this case data flows between lines Ll and Ln and vice versa, and at the end of data transmission a coded end-of-message signal is transmitted, which is detected by the monitor circuit which has been scanning the connection for this purpose. The monitor circuit then recognizes an "end-of-message" and clears the connection. The monitor circuit is connected via the leads RLl/RLn, under control of electronic switches ASA (shown for simplicity as contacts), which are operated by a central processor (not shown) when an auxiliary circuit has been connected to enable data handling.

Another use of an auxiliary circuit which has been mentioned is where the party switching to data may decide to work with a code which differs from that used at the receiving party. In this case he would signal to the control to connect a code converter, and the code converter connected to the auxiliary circuit would mean that the auxiliary circuit found the particular calling condition and stopped at the particular time position associated with this. Hence further signals from line Ll would be transferred via the code converter to line Ln by the stores in the auxiliary circuit. This connection is effected by the electronic switches ASB.

Similarly, if it is necessary for the connection to change speed instead of code, this is done by introducing through the auxiliary circuit AC the speed and/or code converter SCC shown, which enables the message to be transmitted from Ll via the tape machine back to Ln and vice versa. SCC is connected in via a further set of electronic switches ASC. This facility of storage and retransmission is similar to that involved in store-and-forward working, so the same sort of circuit can be used for the handling of store-and-forward arrangements. In the latter two cases of a code converter and a speed change, the peripheral equipment is inserted in series with the transmitted information while in the first application, that of monitoring, it is in parallel.

Figure 2:
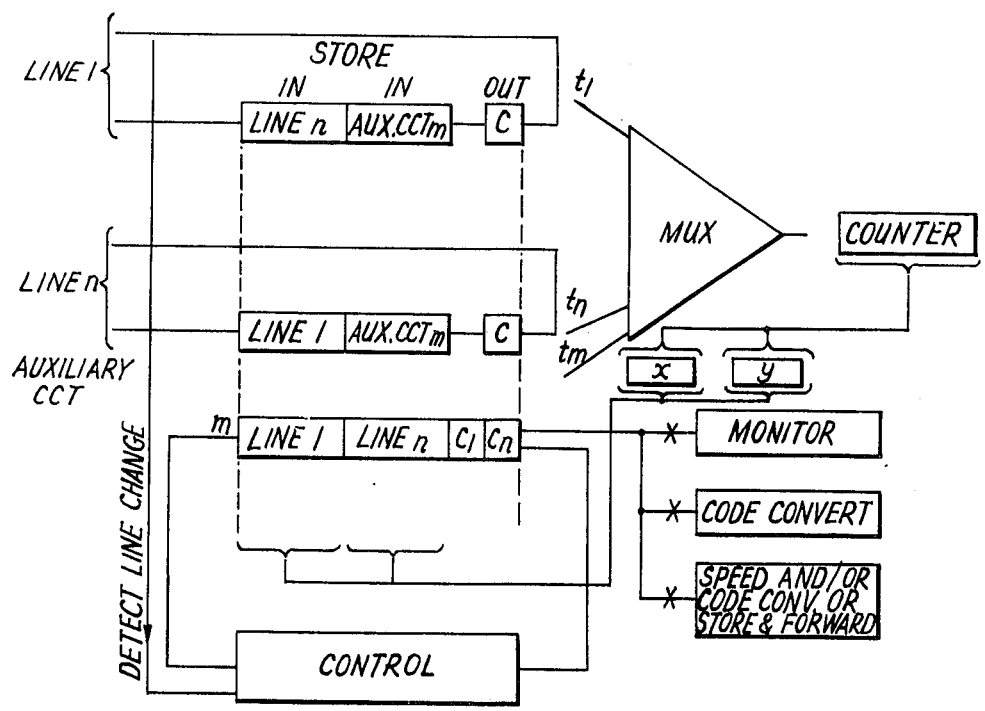
FIG. 2 shows schematically how the switch of FIG. 1 can be realized by the use of storage units.

The realization of this in "more electronic" form may be appreciated more fully from FIG. 2. Here the switches in FIG. 1 are replaced by stores on a per line basis, each store consisting of at least three parts, the line involved in the connection, the auxiliary circuit to be used in the connection, and a store to convey intelligence between the various points in the system. The auxiliary circuit is part of the same storage assembly, but has an additional store so that it is possible to store both the information from the calling party and from the called party. The store is multiplexed under the control of a counter which is driven at clock rate or under the control of the read-out from the store relating to the lines and auxiliary circuits involved, so that the appropriate input is fed to the control of the store to establish the direct connection needed for the function of the system.

FIG. 3 shows the system of FIG. 2 in electronic "hardware." The embryonic stores of FIG. 2 each consist of 64 bit stores such as CS1 arranged in 64 time positions, and repeated 16 times thus affording each time position a 16 bit word. This is in effect a 16 bit store for each of the lines and thus for each of the 64 time positions. This store assembly is controlled separately by the binary counter (Multiplexer) BC, which permits 64 to be counted with the aid of master pulses P4. The output from the store assembly CS1 is placed in the register RS1 so that, at the appropriate time, the store may be set either by the counter BC or by the register RS1 as determined by the operation.

The condition (looped or unlooped) of each line is examined in turn at P1 time, the multiplexer stepping on at each P4 time. When a first calling line condition is detected, the mark bistable BM operates to 1, causing the marking into the store associated with that particular line of the wanted line number, when this has been determined by the control, at $P_2$. The identity of the auxiliary circuit allocated by the control is marked in at $P_3$, for instance if line Ll is to be connected to line Ln then at time t1 which is the equivalent of line Ll, the store will have inserted in the first 6 bits the code description of the line Ln, and in the second 6 bits the code description of the auxiliary circuit involved. Simultaneously, the record of the line Ll and line Ln concerned in the connection is inserted into the store row associated with the auxiliary circuit $m$. The operation will be understood more easily with reference to FIG. 4, which shows the functions involved in the system when using a nondestructive read store but whose contents are changed as required to enable its function. In the present case a semi-conductor store is used, which may be written into when required, but may be read without destroying the stored information.

Consider now that the multiplex counter BC has reached the line Ll position i.e. t1. It is driven there by the pulse P4 which occurs once per multiplex time position so that when the next P1 pulse occurs, the contents of the C store (the right-hand four last places of the store CS1) is read into the line Ll, so that information is transferred from this store to the Ll line. It will be seen later that this information was acquired from line Ln so that, the Ln information is being sent to the Ll terminal. When P2 occurs the selection is controlled by the register which was previously set by the read-out of the Ln code, so P2 causes writing from line Ll into the C store of line Ln. When P3 occurs the second 6 bits of the register cause the selection of the appropriate store row, that of auxiliary m and cause the writing of the condition of the Ll line into the Cl store. P4 clears the register and steps the multiplex counter. The operation proceeds until the counter BC reaches the condition for line Ln, when P1 reads the contents of the Ln store C into line Ll, thus transferring the information from Ln to Ll. Simultaneously the contents of the first 12 bits of the store are read into the register RS so that the register now has the Ll code and the auxiliary m code stored therein. At P2 the system selects the row described by the contents of the first 6 bits of the register, i.e., Ll, and hence writes into the C store of line Ll the information from line Ln. At P3 the second 6 bits of the register sets the selector to the auxiliary m row, to write the condition of the line Ln into the store Cn. At P4 the register is cleared and the multiplex counter BC steps. When the counter reaches the auxiliary m time position P1 reads the Cl of Cm stores to the monitor which checks against its required code framework to see if this should clear the system or not.

Pulses P2 and P3 occur but are not used in the particular time slot. P4 causes the register to be cleared and the multiplex to step.

Considering the code conversion function, the operation is slightly different. When the multiplex counter BC reaches the line Ll time position and P1 occurs, the C content is read to line Ll as before while the code description of line Ln and the auxiliary m circuit are read into the register as before. The P2 pulse is ineffective in this case but P3 sets the selector to be under the control of the second 6 bits of the register as before, allowing the auxiliary m store slot to be accessed, permitting the writing of the condition of line Ll in Cl. P4 causes the register to clear and the multiplex to step on.

When line Ln is reached P1 causes the contents of this C store to be read to line Ln while transferring the contents of the first 6 and the second 6 bits into the register as before. At P3 the slot is selected according to the register setting of the second 6 bits so that the auxiliary m slot is selected and the condition of Ln is written into the store Cm. P4 clears the register and stops the multiplex.

When the multiple counter reaches the auxiliary m position and P1 occurs the contents of both Cl and Cn are read to the code converter while the contents of the first and second 6 bits, in this case the Ll and the Ln lines as before, are read into the register, so that when P2 occurs the register may choose line Ll and enable the writing of the contents of the code converter into the store C. At P3 line Ln is chosen and the contents from the code converter for that particular direction is written into its C store. Finally P4 clears the register and BC is stepped.

The function is really identical for the speed and/or code converter or store and forward function.

It will be seen that the major parts of this circuit may be realized in standard available integrated circuits.

It is to be understood that the foregoing description of specific examples of this invention is made by way of example only and is not to be considered as a limitation on its scope.

We claim:

1. An automatic telecommunication switching center comprising, means coupling lines to a storage array, said lines carrying communication channels set up in TDM manner with each said channel allocated a time slot in the TDM cycle, said storage array including a storage compartment per channel served, each of said storage compartments including an "in" section and an "out" section in which intelligence incoming to the center over one of the channels is recorded directly into that channel's "in" section, in which when a connection is set up between a first and a second channel each of those channels' "in" sections has recorded in it the storage address of the other of those channels plus the intelligence to be sent to that other channel, in which when the compartment for said first channel is scanned during said connection the intelligence in that channel's "out" section is read out to that channel and the contents of that first channel's "in" section is extracted and transferred to the second channel's "out" section under control of the address in that "in" section, in which the intelligence thus extracted from said first channel's "in" section is replaced by intelligence newly received from said first channel, in which when the compartment for said second channel is scanned during said connection the intelligence in that channel's "out" section is read out to the said second channel and the contents of that second channel's "in" section is extracted and transferred to the first channel's "out" section under control of the address in the second channel's "in" section, and in which the intelligence thus extracted from said second channel's "in" section is replaced by intelligence newly received from said second channel.

2. A switching center as claimed in claim 1, including auxiliary circuits and means to connect an auxiliary circuit in parallel with the connection set up through the switching center to connect two of said channels.

3. A switching center as claimed in claim 2, in which at least one said auxiliary circuit is a comparator arranged to detect when a particular code combination occurs during a said connection.

4. A switching center as claimed in claim 3, in which the center can handle both speech connections and data connections, in which a connection is initially set up as a speech connection, whereafter if one of the parties to the connection desires a data connection he sends a special code, and in which the detection by a said comparator of said special code causes the existing connection to be altered so that it can handle data.

5. A switching center as claimed in claim 2, in which at least one said auxiliary circuit is a code converter, whereby intelligence can enter the center in one form and leave the center in a different form, and in which in such case the intelligence passes through the converter instead of through the path in the center which would otherwise be used for that connection.

6. A switching center as claimed in claim 1, in which the intelligence is handled in a delta modulation form.

* * * * *